(12) United States Patent
Milliron et al.

(10) Patent No.: US 9,939,662 B2
(45) Date of Patent: Apr. 10, 2018

(54) ELECTROCHROMIC NANOCOMPOSITE FILMS

(75) Inventors: Delia Milliron, Oakland, CA (US); Anna Llordes, Berkeley, CA (US); Raffaella Buonsanti, Oakland, CA (US); Guillermo Garcia, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 1044 days.

(21) Appl. No.: 14/234,610

(22) PCT Filed: Jul. 24, 2012

(86) PCT No.: PCT/US2012/047935
§ 371 (c)(1),
(2), (4) Date: Apr. 8, 2014

(87) PCT Pub. No.: WO2013/016318
PCT Pub. Date: Jan. 31, 2013

(65) Prior Publication Data
US 2014/0220362 A1 Aug. 7, 2014

Related U.S. Application Data

(60) Provisional application No. 61/511,488, filed on Jul. 25, 2011.

(51) Int. Cl.
*G02F 1/00* (2006.01)
*C09K 9/00* (2006.01)
*G02B 1/00* (2006.01)

(52) U.S. Cl.
CPC .............. *G02F 1/0018* (2013.01); *C09K 9/00* (2013.01); *G02B 1/002* (2013.01)

(58) Field of Classification Search
CPC ...... G02F 1/0018; G02F 1/155; G02F 1/1523; G02F 1/1525; G02F 15/1521;
(Continued)

(56) References Cited

U.S. PATENT DOCUMENTS 4,573,768 A 3/1986 Polak et al.
5,042,923 A * 8/1991 Wolf ..................... G02F 1/1533
359/275
(Continued)

FOREIGN PATENT DOCUMENTS

WO 20080055311 5/2008
WO 2011047198 A1 4/2011

OTHER PUBLICATIONS

First Notification of Office Action CN201280036901.5 dated Nov. 4, 2016, 6 pages.
(Continued)

*Primary Examiner* — Ricky Mack
*Assistant Examiner* — Kristina Deherrera
(74) *Attorney, Agent, or Firm* — Womble Bond Dickinson (US) LLP

(57) ABSTRACT

The present invention provides an electrochromic nanocomposite film. In an exemplary embodiment, the electrochromic nanocomposite film, includes (1) a solid matrix of oxide based material and (2) transparent conducting oxide (TCO) nanostructures embedded in the matrix. In a further embodiment, the electrochromic nanocomposite film farther includes a substrate upon which the matrix is deposited. The present invention also provides a method of preparing an electrochromic nanocomposite film.

16 Claims, 19 Drawing Sheets

(58) Field of Classification Search
CPC ........ G02F 1/1533; G02F 1/03; G02F 1/0316; G02F 3/16; G02F 1/163; G02F 1/0015; C09K 9/00; C09K 9/02; B60R 1/088; H04N 9/3137; H04N 9/22
USPC ............ 359/245–284, 242; 350/357; 349/49, 349/105; 438/929
See application file for complete search history.

(56) References Cited

U.S. PATENT DOCUMENTS

| | | | | |
|---|---|---|---|---|
| 5,618,390 | A | 4/1997 | Yu | |
| 7,742,216 | B2* | 6/2010 | Noh | B82Y 20/00 252/582 |
| 8,687,261 | B2* | 4/2014 | Gillaspie | C09K 9/00 359/265 |
| 8,736,942 | B2* | 5/2014 | Risser | G02F 1/15 345/105 |
| 2009/0147370 | A1 | 6/2009 | Parkin | |
| 2010/0208325 | A1* | 8/2010 | Piroux | G02F 1/15 359/268 |
| 2010/0255183 | A1 | 10/2010 | Wu et al. | |
| 2011/0015297 | A1 | 1/2011 | Destro | |

OTHER PUBLICATIONS

International Search Report and Written Opinion for PCT Patent Application No. PCT/US2012/047935, filed on Jul. 24, 2012, 1 page.

Llordes, A. et al. (2011). "Polyoxometalates and Colloidal Nanocrystals as Building Blocks for Metal Oxide Nanocomposite Films," J. Mater. Chem. 21:11631-11638.

Ma, Y. et al. (1991). "Development of Laminated Nickel/Manganese oxide and Nickel/Niobium Oxide Electrochromic Devices" LBNL, 12 pages.

BANGER, K.K. et al. (2011). "Low-Temperature, High-Performance Solution-Processed Metal Oxide Thin-Film Transistors Formed by a Sol-Gel on Chip Process," Nature Materials, 10:45-50.

Buonsanti, R. et al. (2011). "Tunable Infrared Absorption and Visible Transparency of Colloidal Aluminum-Doped Zinc Oxide Nanocrystals," Nano Letters, 11:4706-4710.

Garcia, G. et al. (2011). "Dynamically Modulating the Surface Plasmon Resonance of Doped Semiconductor Nanocrystals," Nano Letters, 11:4415-4420.

Kim, M-G. et al. (2011). "Low-Temperature Fabrication of High-Performance Metal Oxide Thin-Film Electronics via Combustion Processing," Nature Material, 10:382-388.

Niklasson, G.A. et al. (2007). "Electrochromics for Smart Windows: Thin Films of Tungsten Oxide and Nickel Oxide, and Devices Based on These," J. Mater. Chem. 17:1127-156.

Supplementary European Search Report for EP Application No. 12 81 7312, dated Apr. 28, 2015, 9 pages.

Notice of Allowance for EP Application No. 12 81 7312, dated Oct. 10, 2017, 3 pages.

Park et al. "Fast switching electrochromism from colloidal indium tin oxide in tungstate-based thin film assemblies," Electrochimica Acta, Elsevier Science Publishers, Barking, GB, vol. 55, No. 9, Mar. 2010, pp. 3257-3267.

* cited by examiner

Tin-doped Indium Oxide (ITO) Nanocrystal Film

Substrate

FIG. 1C
(PRIOR ART)

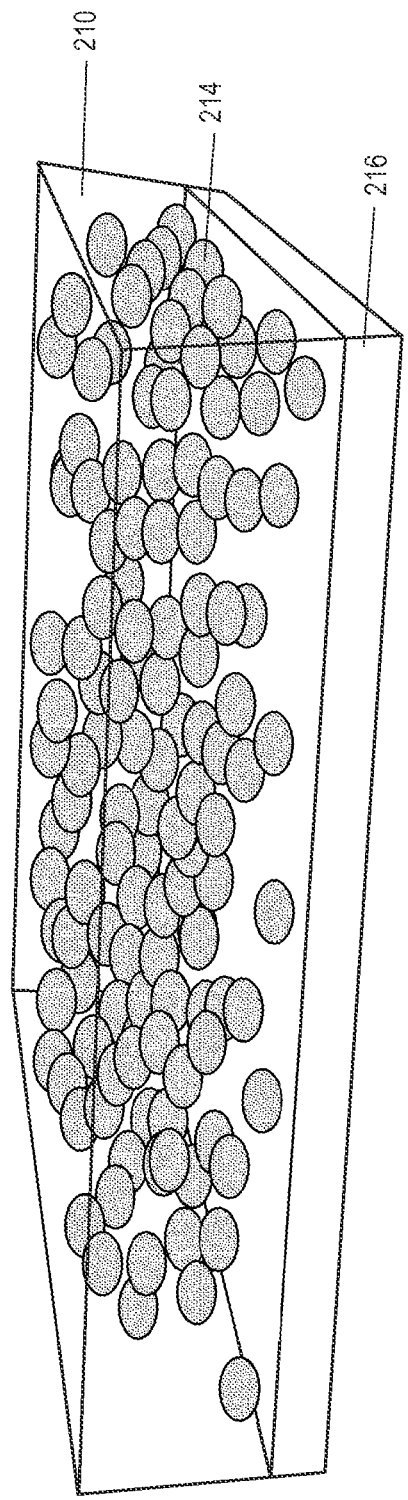

ELECTROCHROMIC NANOCOMPOSITE FILMS

RELATED APPLICATIONS

This application is a US National Stage 371 Application of PCT application No.: PCT/US2012/047935, filed Jul. 24, 2012, which claims priority to U.S. Provisional Patent Application Ser. No. 61/511,488, filed Jul. 25, 2011, entitled Electrochromic Nanocomposite Films, the contents of said applications are hereby incorporated by reference as if fully set forth in their entirety herein.

STATEMENT OF GOVERNMENT SUPPORT

This invention was made with government support under Contract No. DE-AC02-05CH11231 awarded by the U.S. Department of Energy. The government has certain rights in this invention.

FIELD OF THE INVENTION

The present invention relates to the field of electrochromics, and particularly relates to an electrochromic nanocomposite film.

BACKGROUND OF THE INVENTION

Need

Around 30-40% of the primary energy used in the world is spent on the building sector, basically on heating, cooling and lighting[1]. The use of energy-efficient windows in commercial and domestic buildings could reduce significantly such energy consumption. However, current window technologies, based on solar control and low-emissivity coatings, are limited to a fixed climate condition (i.e., or hot climate or cold climate). Therefore universal window technologies are desired to dynamically control the heat/light of buildings depending on comfort demands and environmental fluctuations.

Prior Art

Electrochromic Materials

Electrochromic (EC) materials are able to reversibly switch their optical properties when a voltage is applied, thus appearing as promising materials for universal energy-efficient windows. Nowadays, $WO_3$ (tungsten oxide) is the most used electrochromic coating in commercially available windows. Nevertheless, when $WO_3$ switches, it modulates mainly the visible part of the light (400-750 nm), while the near infrared (NIR) light (750-2500 nm) remains either unchanged or switches simultaneously with the visible[2]. This behavior is typical of the so-called conventional EC materials such us $Nb_2O_5$, $NiO$ or $V_2O_5$.

Independent modulation of visible and NIR light is not possible with existing electrochromic materials, as shown in prior art FIGS. 1A, 1B, 1C, and 1D. One type of prior art electrochromic film includes a $Nb_2O_5$ thin film on top of a substrate as shown in prior art FIG. 1A. Unfortunately, such prior art electrochromic film simultaneous modulates visible and infrared (IR) light, as shown in prior art FIG. 1B. Niobium oxide modulates the visible light and the NIR light simultaneously. Typically, the redox potentials of visible-active metal oxide films are at specific values (e.g., ~2V for $Nb_2O_5$).

Another type of prior art electrochromic film includes a plasmonic electrochromic nanocrystal film (e.g., a tin-doped indium oxide (ITO) nanocrystal film) on top of a substrate as shown in prior art FIG. 1C. Unfortunately, such prior art electrochromic film modulates only NIR light, as shown in prior art FIG. 1D.

Conductivity is also a key limiting characteristic of many EC materials, contributing to slow switching times, poor coloration efficiencies, and eventual material degradation. EC materials also typically have specific redox potentials at which they switch.

ITO Nanocrystals

Prior art ITO nanocrystals switch specifically in the NIR region.

In order to modulate the NIR light transmittance and thus control the amount of heat that enters the building through windows, new electrochromic materials for windows need to be developed. Therefore, an electrochromic nanocomposite film is needed.

SUMMARY OF THE INVENTION

The present invention provides an electrochromic nanocomposite film. In an exemplary embodiment, the electrochromic nanocomposite film includes (1) a solid matrix of oxide based material and (2) transparent conducting oxide (TCO) nanostructures embedded in the matrix. In a further embodiment, the electrochromic nanocomposite film further includes a substrate upon which the matrix is deposited.

BRIEF DESCRIPTION OF THE DRAWINGS

The foregoing aspects and others will be readily appreciated by the skilled artisan from the following description of illustrative embodiments when read in conjunction with the accompanying drawings.

FIG. 2A illustrates an exemplary embodiment of the invention depicting a film including a solid matrix having a transparent conducting oxide nanostructure embedded therein.

DETAILED DESCRIPTION

Figure 1A:
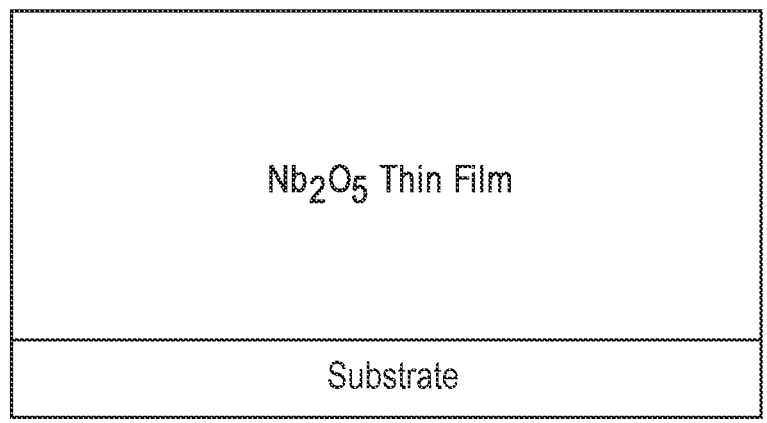
FIGS. 1A and 1C illustrate films of the prior art along with the respective transmittance properties of these films as shown in FIGS. 1B, and 1D.
Figure 1B:
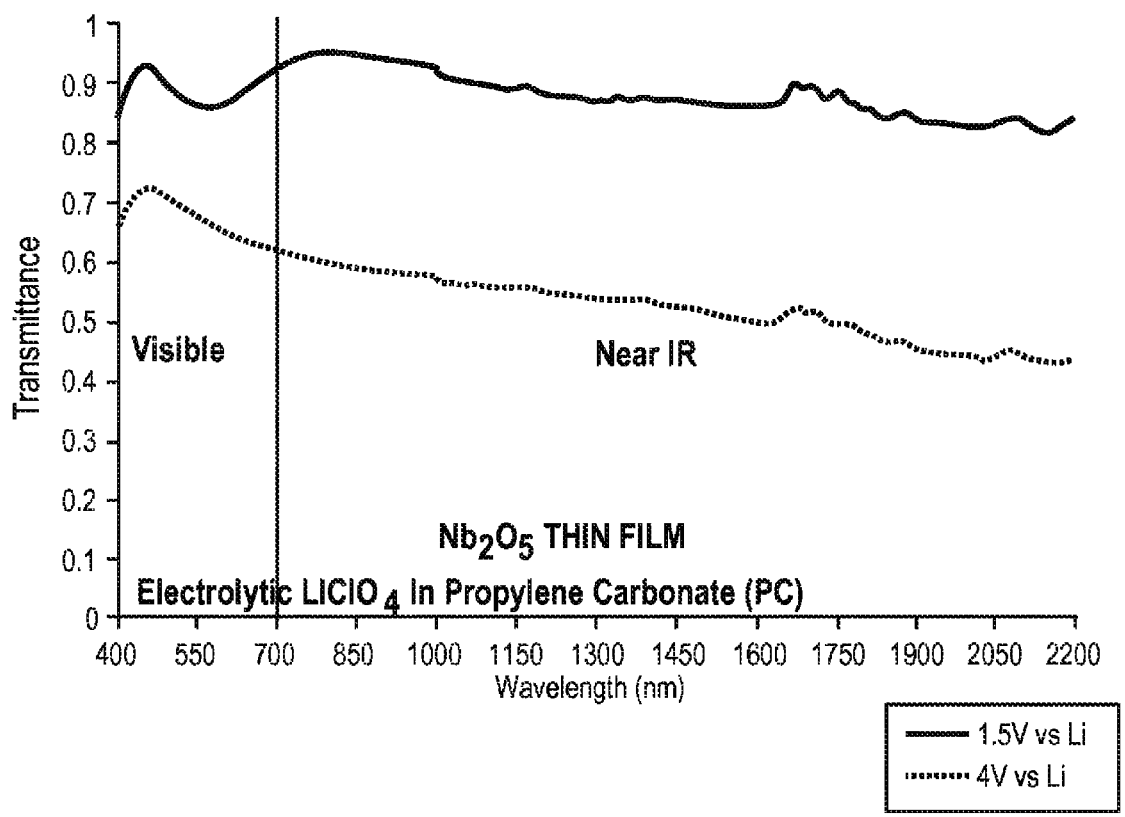
Figure 1D:
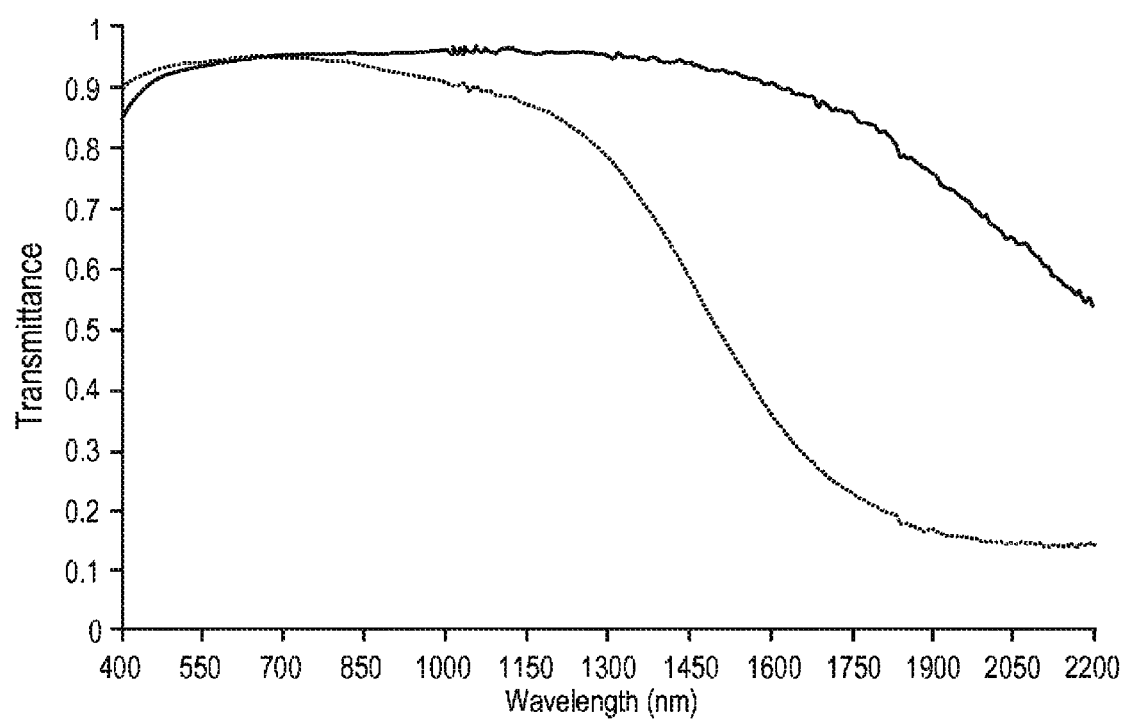

Referring to FIG. 2A, in an exemplary embodiment, the present invention includes a solid matrix 210 of oxide based material and transparent conducting oxide (TCO) nanostructures 214 embedded in matrix 210. In a further embodiment, as shown in FIG. 2A, the electrochromic nanocomposite film further includes a substrate 216 upon which matrix 210 is deposited.

Solid Matrix

Materials

In an exemplary embodiment, matrix 210 includes metal oxides. In a particular embodiment, the metal oxides include niobium oxide. In a particular embodiment, the metal oxides include vanadium oxide. In a particular embodiment, the metal oxides include tantalum oxide. In a particular embodiment, the metal oxides include nickel oxide.

In an exemplary embodiment, matrix 210 includes polyoxometallate clusters. In a particular embodiment, the polyoxometallate clusters include polyniobates. In a particular embodiment, the polyoxometallate clusters include vanadates.

Structure

In an exemplary embodiment, matrix 210 includes solid electrolyte material, where the solid electrolyte material is able to show approximately no optical change in response to an applied bias voltage. In an exemplary embodiment, the solid electrolyte material allows ions within matrix 210 to move in response to the applied voltage. In a particular embodiment, the ions charge nanostructures 214, thereby resulting in charged nanostructures. In a particular embodiment, the charged nanostructures modulate the near infrared (NIR) transmittance of the film.

In an exemplary embodiment, matrix 210 includes electrochromic material, where the electrochromic material is able to darken and bleach reversibly in at least the visible range of the electromagnetic spectrum in response to a first applied bias voltage. In an exemplary embodiment, the first applied bias voltage charges nanostructures 214, thereby resulting in charged nanostructures. In a particular embodiment, the charged nanostructures modulate the near infrared (NIR) transmittance of the film.

In an exemplary embodiment, a second applied bias voltage charges nanostructures 214, thereby resulting in charged nanostructures. In a particular embodiment, the charged nanostructures modulate the near infrared (NIR) transmittance of the film.

Nanostructures

Structure

In an exemplary embodiment, nanostructures 214 include TCO nanocrystals. In an exemplary embodiment, nanostructures 214 include TCO nanowires. In an exemplary embodiment, nanostructures 214 include TCO nanorods. In an exemplary embodiment, nanostructures 214 include TCO nanoporous material.

Materials

In an exemplary embodiment, nanostructures 214 include tin-doped indium oxide (ITO). In an exemplary embodiment, nanostructures 214 include aluminum-doped zinc oxide (AZO). In an exemplary embodiment, nanostructures 214 include gallium-doped zinc oxide. In an exemplary embodiment, nanostructures 214 include indium, gallium-doped zinc oxide. In an exemplary embodiment, nanostructures 214 include indium-doped zinc oxide.

Substrate

In an exemplary embodiment, substrate 216 includes glass. In an exemplary embodiment, the glass is coated with a transparent conductor. In a particular embodiment, the transparent conductor includes a tin-doped indium oxide (ITO) layer.

In an exemplary embodiment, substrate 216 includes plastic. In an exemplary embodiment, the plastic is coated with a transparent conductor. In a particular embodiment, the transparent conductor includes a tin-doped indium oxide (ITO) layer.

Method

The present invention also provides a method of preparing an electrochromic nanocomposite film. In an exemplary embodiment, the method includes combining polyoxometallates (POMs) and colloidal oxide nanocrystals via ex-situ (in solution) exchange of organic capping ligands of the nanocrystals by the POMs, thereby resulting in a POM-capped tin-doped indium oxide (ITO) nanocrystal film. In an exemplary embodiment, the method includes combining polyoxometallates (POMs) and colloidal oxide nanocrystals via in-situ (within the film) exchange of organic capping ligands the nanocrystals by the POMs, thereby resulting in a POM-capped tin-doped indium oxide (ITO) nanocrystal film. In an exemplary embodiment, the method includes (1) co-sputtering two metal oxide materials and (2) controlling the temperature and other deposition parameters of the co-sputtering, thereby resulting in the phase segregation of the materials to form the film. In an exemplary embodiment, the method includes over coating a nanoporous film of transparent conducting oxide (TCO) nanocrystals with a metal oxide material via phase deposition.

In Situ Combining

Figure 3A:
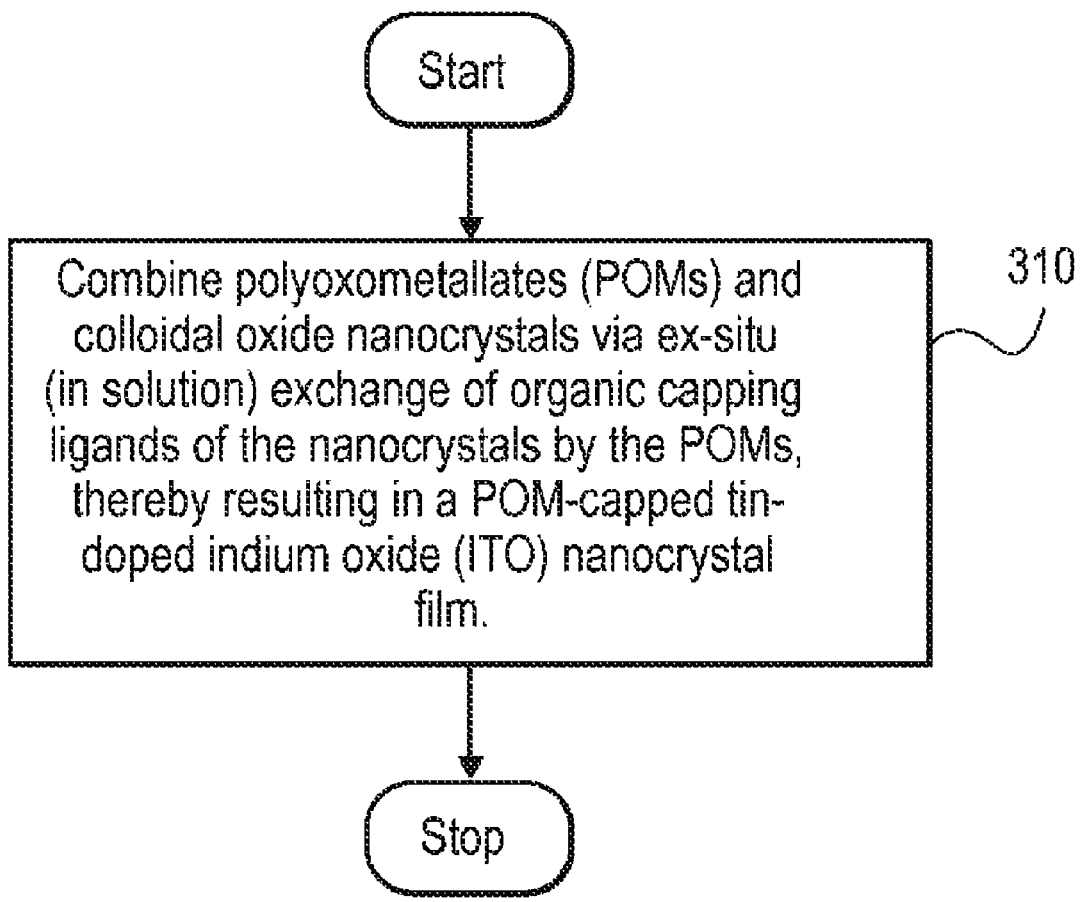
FIGS. 3A and 3B display process steps for forming an electrochromic film according to an exemplary embodiment of the invention.
Figure 3B:
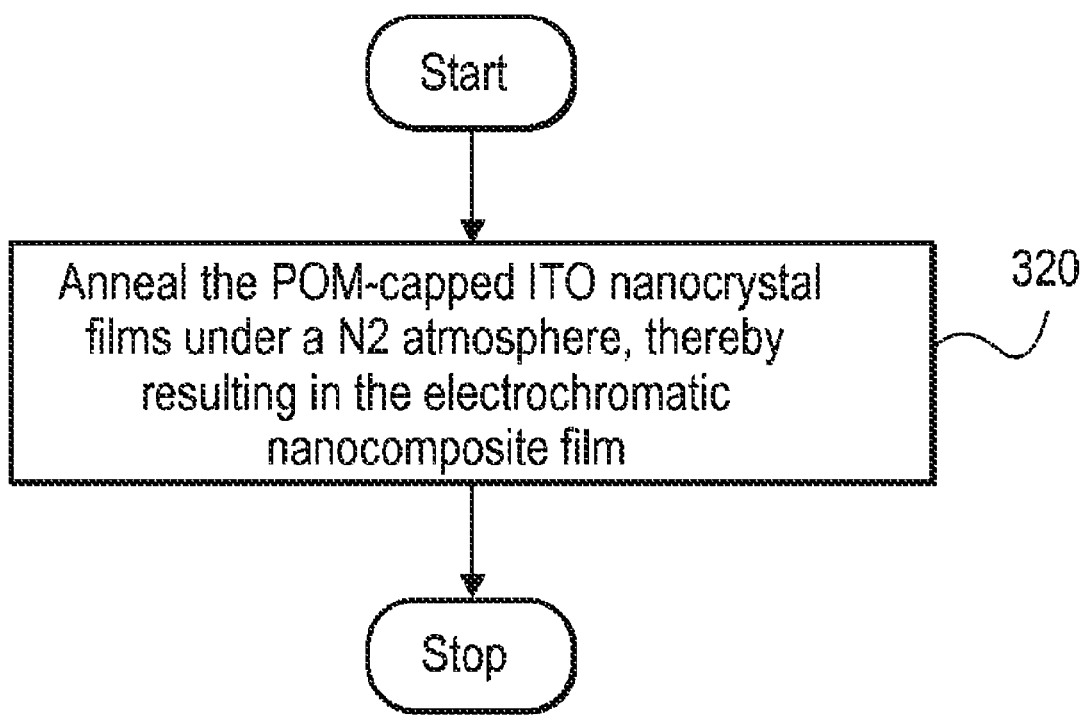

Referring to FIG. 3A, in an exemplary embodiment, the present invention includes a step 310 of combining polyoxometallates (POMs) and colloidal oxide nanocrystals via ex-situ (in solution) exchange of organic capping ligands of the nanocrystals by the POMs, thereby resulting in a POM-capped tin-doped indium oxide (ITO) nanocrystal film. Referring to FIG. 3B, in a further embodiment, the present invention further includes a step 320 of annealing the POM-capped ITO nanocrystal films under a $N_2$ atmosphere, thereby resulting in the electrochromic nanocomposite film.

Ex Situ Combining

Figure 4A:
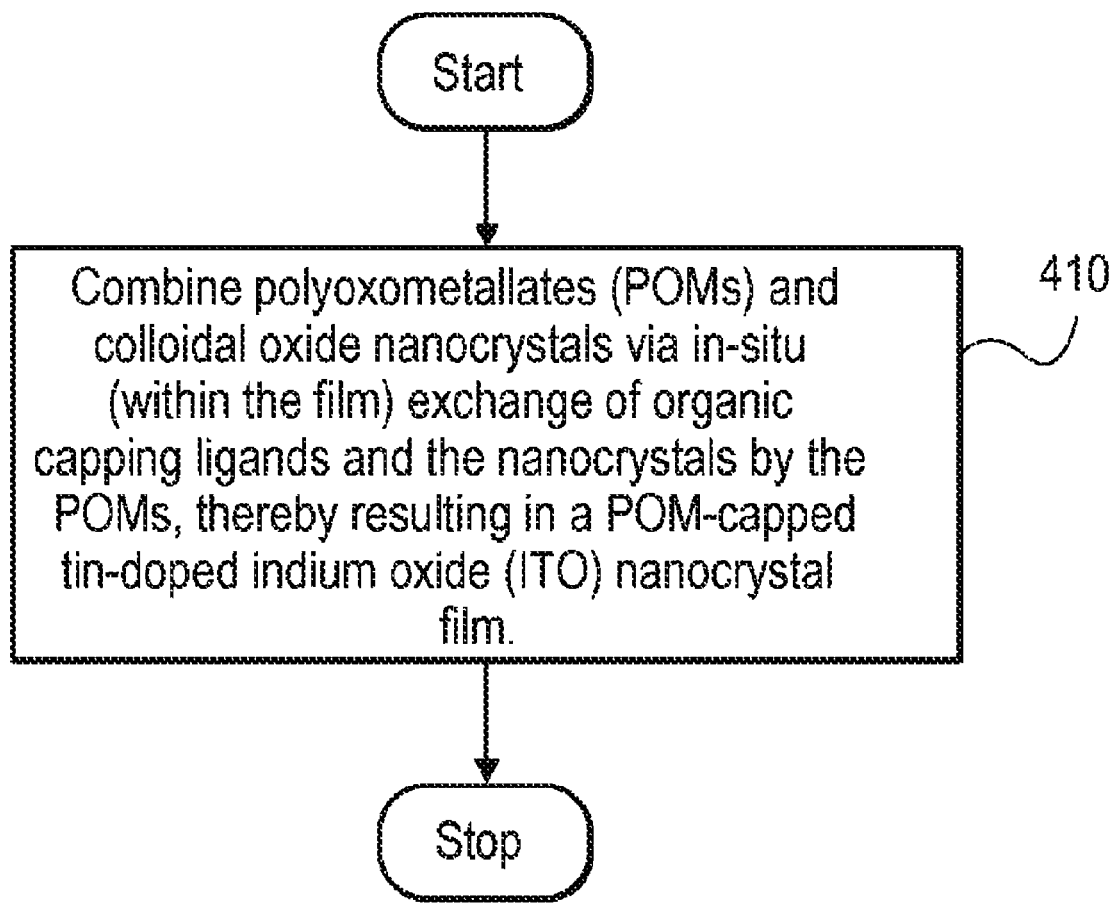
FIGS. 4A and 4B depict process steps for forming an electrochromic film according to an alternative exemplar embodiment of the invention.
Figure 4B:
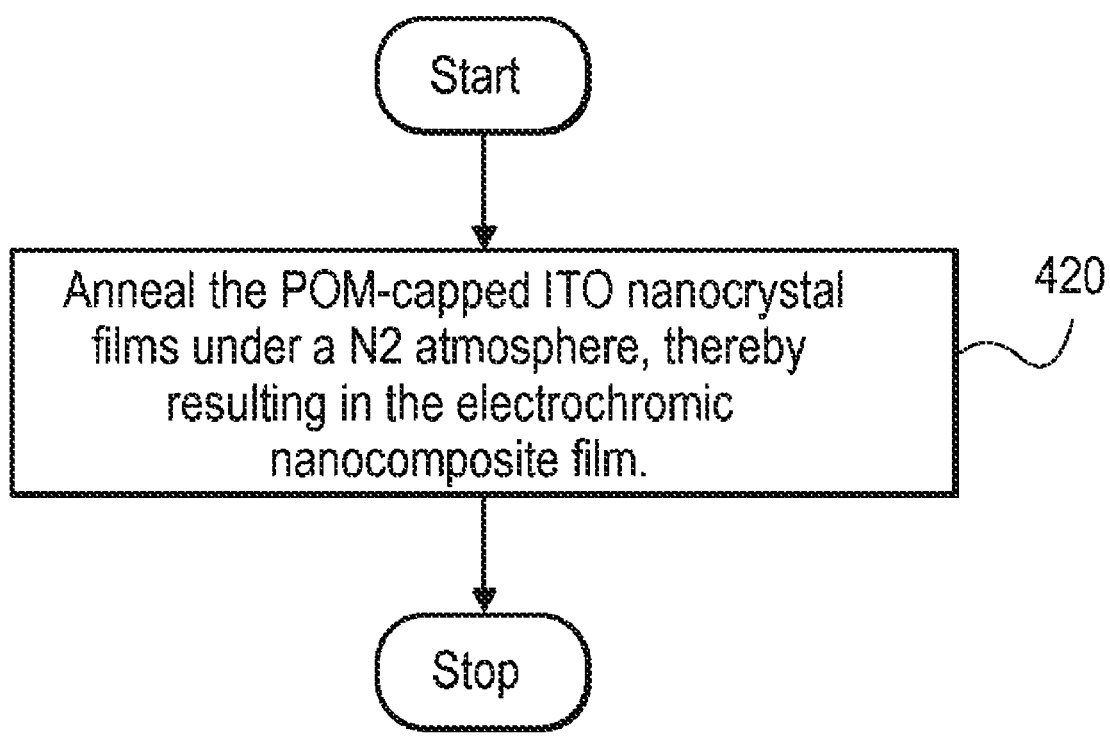

Referring to FIG. 4A, in an exemplary embodiment, the present invention includes a step 410 of combining polyoxometallates (POMs) and colloidal oxide nanocrystals via in-situ (within the film) exchange of organic capping ligands of the nanocrystals by the POMs, thereby resulting in a POM-capped tin-doped indium oxide (ITO) nanocrystal film. Referring to FIG. 4B, in a further embodiment, the present invention further includes a step 420 of annealing the POM-capped ITO nanocrystal films under a $N_2$ atmosphere, thereby resulting in the electrochromic nanocomposite film.

Co-Sputtering

Figure 5:
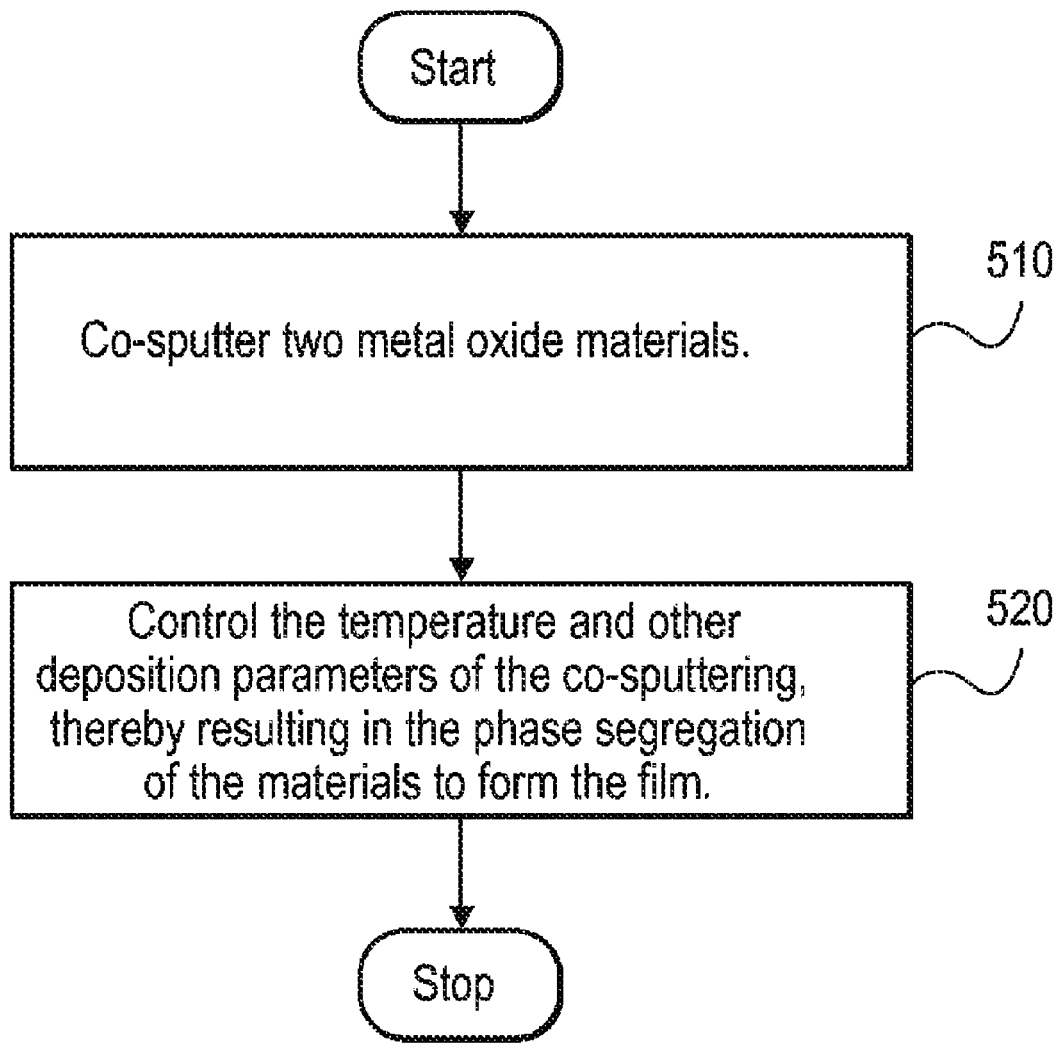
FIG. 5 depicts a still further alternative method for forming an electrochromic film according to an exemplary embodiment of the invention.

Referring to FIG. 5, in an exemplary embodiment, the present invention includes a step 510 of co-sputtering two metal oxide materials and a step 520 of controlling the temperature and other deposition parameters of the co-sputtering, thereby resulting in the phase segregation of the materials to form the film.

Over Coating

Figure 6A:
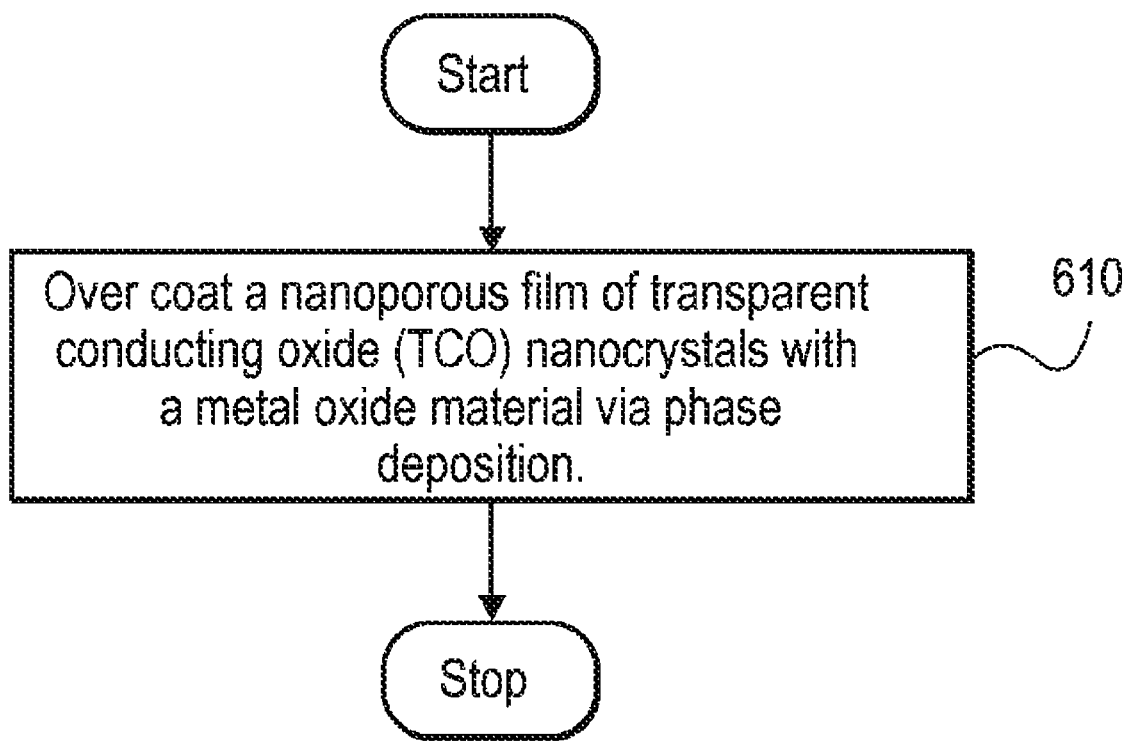
FIGS. 6A-6E depict various techniques for over-coating a nanoporous film to form the electrochromic films of the invention.
Figure 6B:
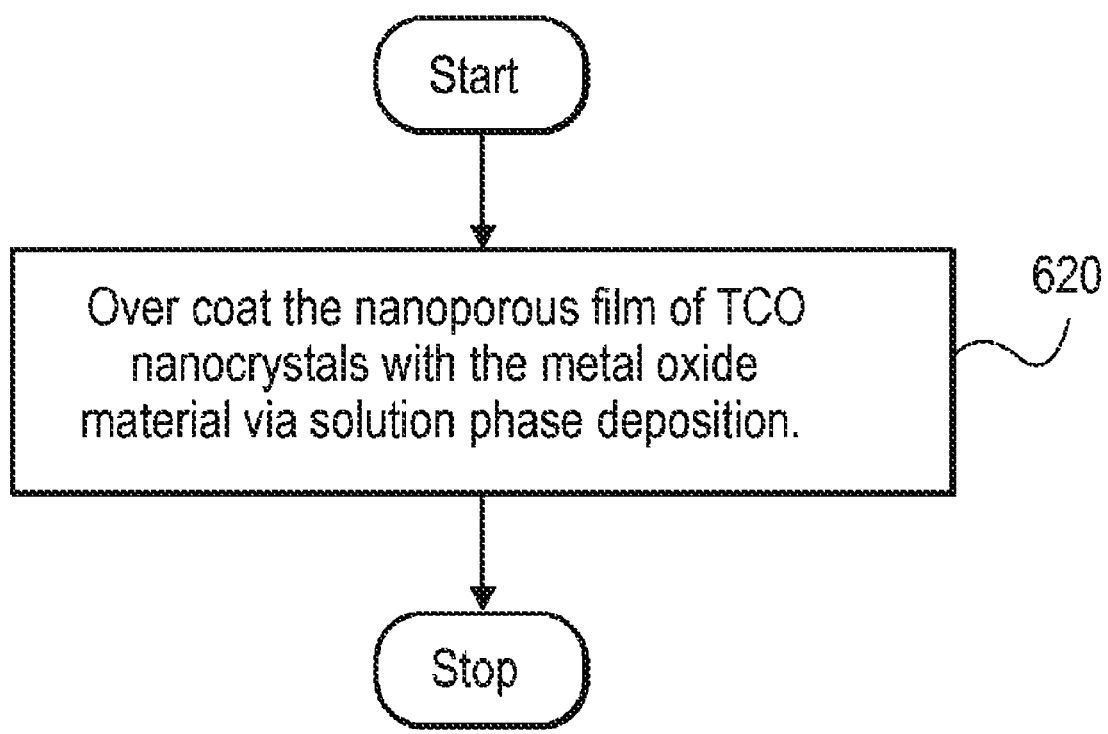
Figure 6C:
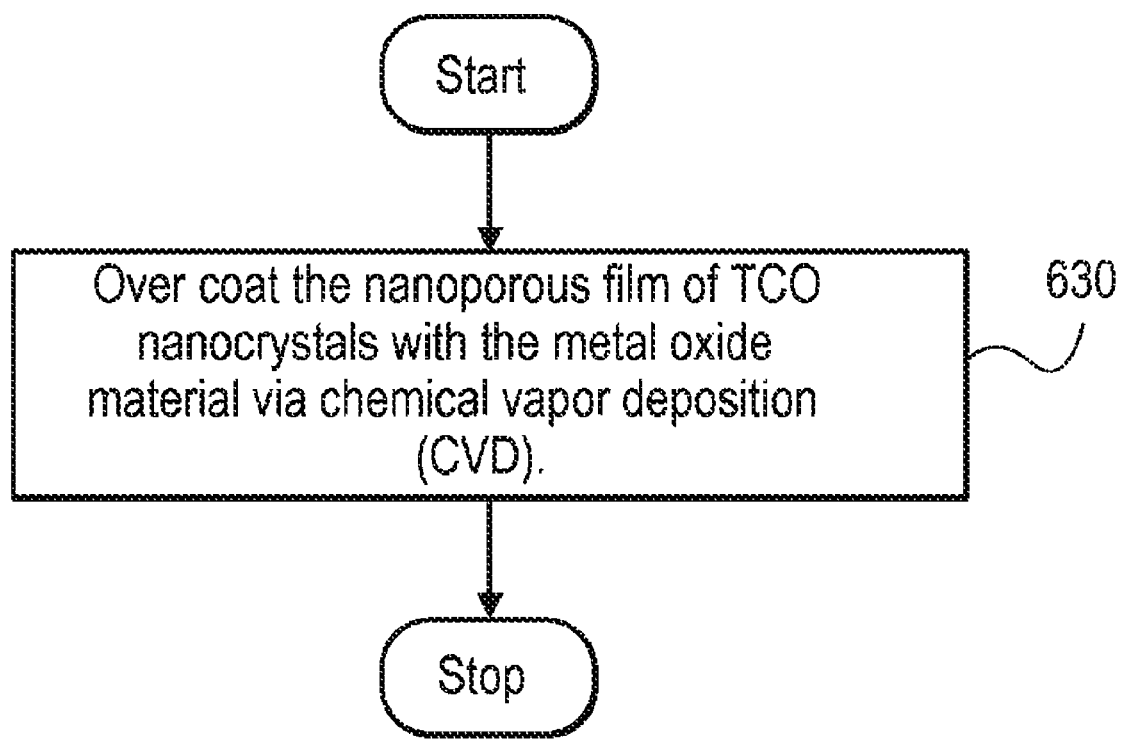
Figure 6D:
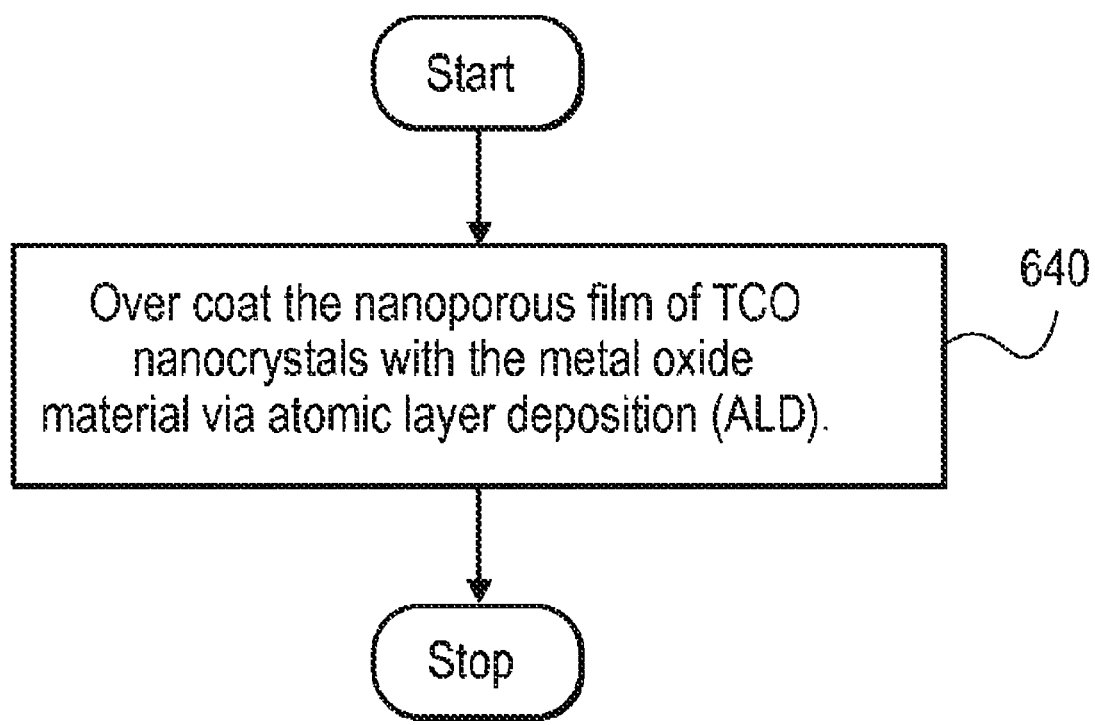
Figure 6E:
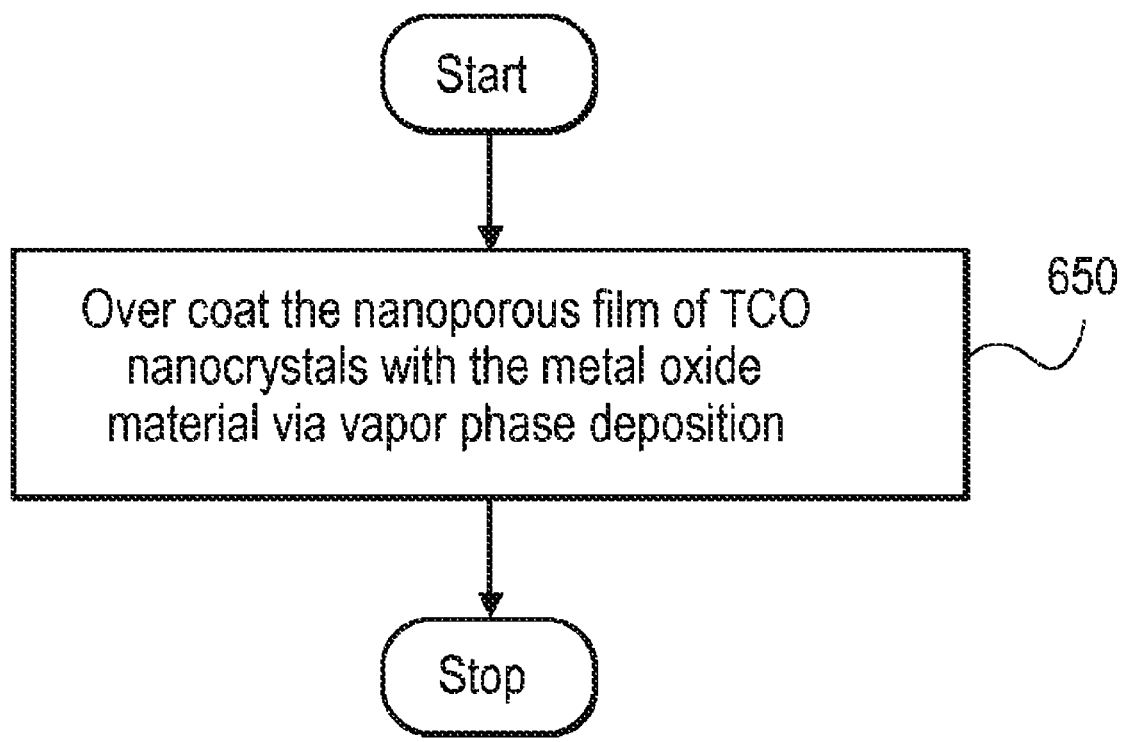

Referring to FIG. 6A, in an exemplary embodiment, the present invention includes a step 610 of over coating a nanoporous film of transparent conducting oxide (TCO) nanocrystals with a metal oxide material via phase deposition. Referring to FIG. 6B, in an exemplary embodiment, over coating step 610 includes a step 620 of over coating the nanoporous film of TCO nanocrystals with the metal oxide material via solution phase deposition. Referring to FIG. 6C, in an exemplary embodiment, over coating step 610 includes a step 630 of over coating the nanoporous film of TCO nanocrystals with the metal oxide material via chemical vapor deposition (CVD). Referring to FIG. 6D, in an exemplary embodiment, over coating step 610 includes a step 640 of over coating the nanoporous film of TCO nanocrystals with the metal oxide material via atomic layer deposition (ALD). Referring to FIG. 6E, in an exemplary embodiment, over coating step 610 includes a step 650 of over coating the nanoporous film of TCO nanocrystals with the metal oxide material via vapor phase deposition.

General

The present invention provides electrochromic nanocomposite materials capable of modulating both the visible and the NIR light or selectively modulating NIR light, depending on the matrix material employed. The present invention provides a nanocomposite film that consists of nanocrystals of a transparent conducting oxide, such as Sn-doped $In_2O_3$ (ITO) or aluminum doped zinc oxide (AZO), embedded in a solid matrix that may be either a conventional EC material like $Nb_2O_5$ or a solid electrolyte.

In an exemplary embodiment, the present invention provides NIR-active nanocrystals embedded within a functional solid matrix (e.g., visible-active) in order to expand the solid matrix's dynamic spectral response. The present invention provides the inclusion of NCs in a solid matrix, thereby resulting in a nanocomposite film.

In an exemplary embodiment, the present invention provides two types of electrochromic nanocomposite films. In each case, transparent conducting oxide nanocrystals (e.g., ITO) are homogeneously embedded in a solid matrix, which can be composed either of polyoxometallate clusters (e.g., polyniobates, vanadates) or transition metal oxides (e.g., niobium oxide, vanadium oxide). In an exemplary embodiment, the optical functionality of the matrix will depend both on the composition of the matrix and the applied bias voltage.

Example

The present invention will now be described in by way of a specific example. The following example is offered for illustrative purposes, and is intended neither to limit nor define the invention in any manner.

Materials

In an exemplary embodiment, the present invention provides two types of electrochromic nanocomposite films. In each case, in an exemplary embodiment, TCO nanocrystals (NCs) are embedded in a solid matrix to form a nanocomposite. In an exemplary embodiment, the matrix is either (i) a solid electrolyte material, which shows little or no optical change under applied bias or (ii) an electrochromic (EC) material, which darkens and bleaches reversibly in, at least, the visible spectral range.

Solid Electrolyte Matrix

When the matrix is a solid electrolyte material, the TCO nanocrystals are the sole active element of the electrochromic film, providing selective switching of NIR transmittance. The solid electrolyte allows ions to move in response to injected or extracted charge, thereby facilitating the charging of the nanocrystals which is responsible for the modulation. Solid electrolytes (versus liquid or gel electrolytes) are highly preferable for many applications of EC coatings, especially buildings. This is because of the greater durability and stability they provide over the long term under conditions of exposure to solar radiation.

EC Matrix Material

When the matrix is an electrochromic (EC) material, in addition to the NIR modulation via the TCO NCs, the present invention is able to modulate visible light by switching the EC matrix material. This could improve the dynamic range of the modulated solar heat gain coefficient of the present invention compared to either the EC material alone or to the TCO NCs alone. The ratio of the two components could be tuned to adjust the visible vs. NIR response to optimize energy performance and to meet aesthetic demands. In addition, the electrical conductivity of the present invention could be enhanced compared to the EC material alone since the TCO NCs are highly conducting.

The present invention allows for choosing the EC matrix material such that the NIR electrochromic response of the TCO NCs and the visible (and possibly NIR) response of the matrix material occur at different applied biases, or at least respond variably to the applied bias. Therefore, in one single, composite EC layer, the present invention could provide somewhat separable control over the amount of light and heat going through a window, which could substantially reduce costs in the lighting and heating/cooling systems of buildings using such windows, while providing shading from glare when desired.

Methods

The present invention also provides a method of preparing electrochromic nanocomposite films.

Polyoxometallates and Colloidal Oxide Nanocrystals

In an exemplary embodiment, the present invention uses polyoxometallates (POMs) and colloidal oxide nanocrystals. In particular embodiment, the present invention combines polyniobates and vanadates with Sn-doped In2O3 (ITO) nanocrystals leading to Nb2O5-ITO, $V_2O_5$-ITO and $VO_2$-ITO nanocomposite films, respectively. Compared to other solution-phase methodologies, the present invention can offer excellent control of the nanoinclusion composition, size, morphology, and volume fraction of the resulting electrochromic nanocomposite films.

The present invention includes two different methodologies, which are based on the ex-situ (in solution) and in-situ (within the film) ligand exchange of the pristine organic capping ligands of the nanocrystals by POMs[3,4]. The metal oxide nanocomposite films have been obtained after annealing the POM-capped ITO nanocrystal films under controlled $N_2$ atmosphere.

Co-Sputtering

Other methods to prepare nanocomposite metal oxide films include co-sputtering of the two metal oxide materials, where phase segregation to form a composite can be introduced by controlling the temperature and other deposition parameters, perhaps adding a post-deposition annealing step.

Overcoating

In an alternative embodiment, a nanoporous film of TCO nanocrystals could be over coated by the EC material by solution-phase deposition (like chemical bath or electrodeposition) or vapor phase methods, such as ALD.

Results

Electrochromic response in these metal oxide nanocomposite films has been demonstrated by spectro-electrochemical measurements. Both of the two cases described above have been demonstrated. Through control over size and doping concentration, the spectral response of the device can be finely tuned.

It has been demonstrated that by selecting the appropriate working potential (applied bias voltage), metal oxide matrices can act either as a solid electrolyte material (i.e., little or no optical change under applied bias) or as an electrochromic material (i.e., darkens and bleaches reversibly in the visible spectral range). In addition, it has been shown show that matrices composed of polyoxometallate clusters, mainly act as solid electrolyte materials.

It has been demonstrated that combining ITO nanocrystals and niobium oxide into a single nanocomposite film, in accordance with an exemplary embodiment of the present invention, and applying different voltages results in independent modulation of the NIR and visible light. It has been shown that applying different bias voltages to the present invention allows for dynamic control of the visible light switching of the present invention. At the same time, the present invention allows for NIR light to be modulated, through a capacitive process occurring at the ITO nanocrystal surface. By selecting the working potential applied bias voltage), it has been shown that the intrinsic electrochromic properties of the components of the present invention can be decoupled. Therefore, the present invention has been demonstrated to be able to modulate independently the visible and NIR region of the solar spectrum, thus providing dynamic spectral control.

The present invention provides electrochromic nanocomposite films that can dynamically and even independently modulate the light transmittance over the full solar spectrum. It has been demonstrated that the spectral range response of the present invention could be finely tuned by modifying the composition and volume fraction of the building blocks as well as by applying the appropriate bias voltage conditions.

Figure 2B:
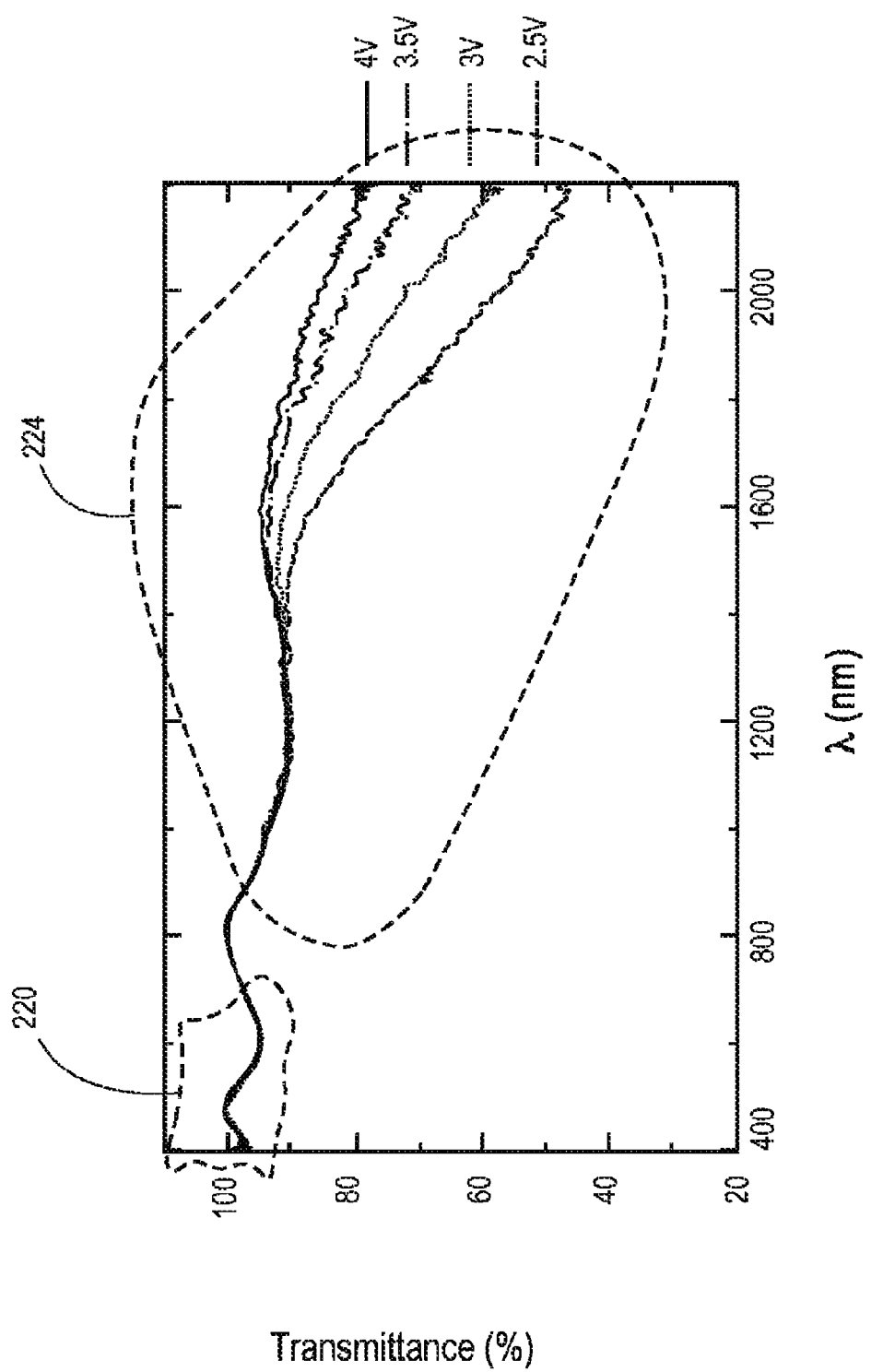
FIGS. 2B and 2C are plots of transmittance spectra of single Nb2O5-ITO nanocomposite film according to an exemplary embodiment of the invention at different applied bias voltages.
Figure 2C:
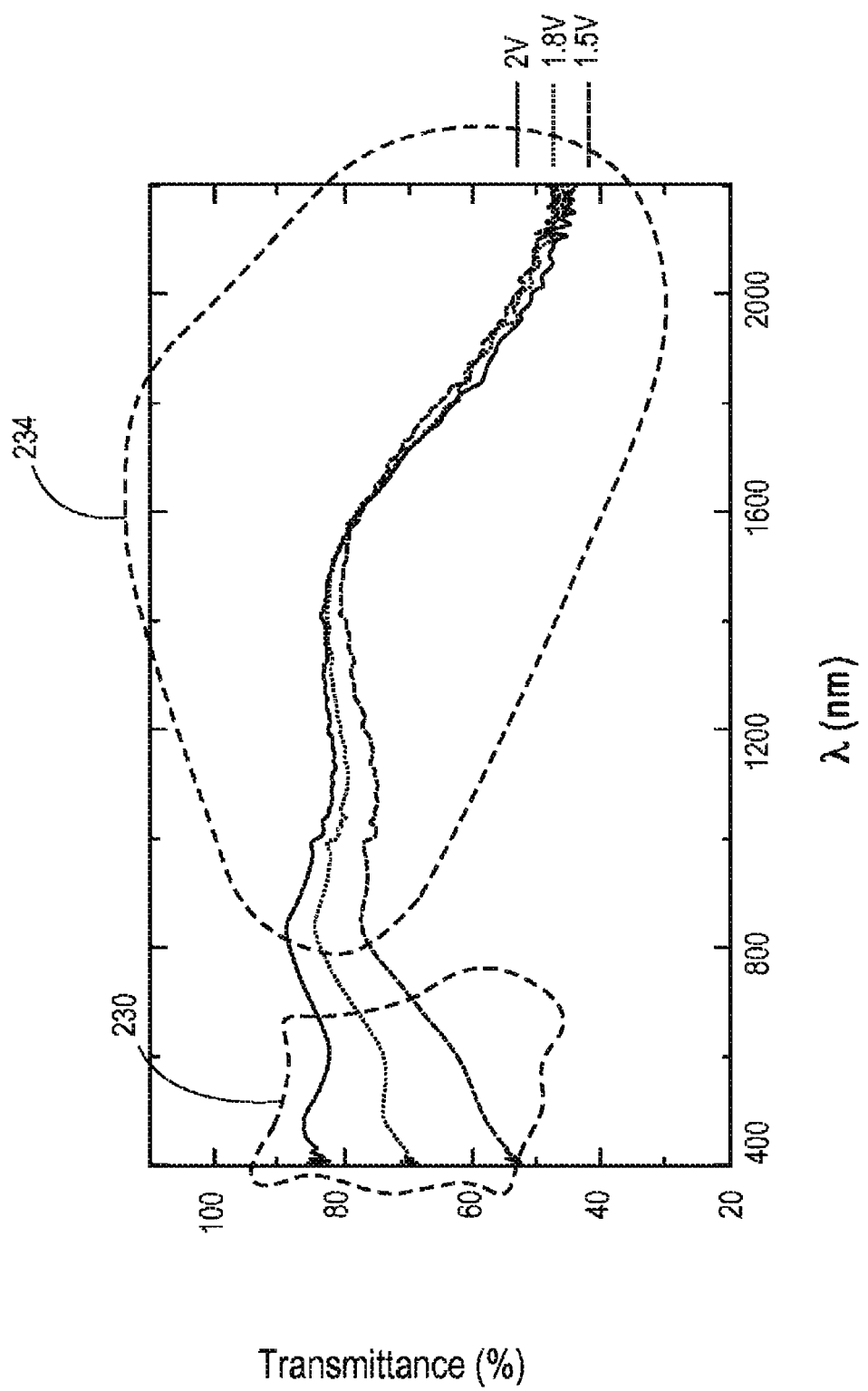

FIG. 2B and FIG. 2C show the transmittance spectra of a single $Nb_2O_5$-ITO nanocomposite film, in accordance with an exemplary embodiment of the present invention, at different applied bias voltages (between 4V and 1.5V).

NIR Modulation

Since the applied bias voltage in FIG. 2B was more positive than the redox potential of $Nb_2O_5$, the redox reaction was not energetically favorable, and the visible region 220 of the solar spectrum remained approximately unchanged by the present invention. Only the NIR region 224 was affected by the present invention due to the modulation of the surface plasmon absorption related to the increase of the free carrier's concentration in the ITO nanocrystals.

Visible Light Modulation

By contrast, since the applied bias voltage in FIG. 2C was more negative than the $Nb_2O_5$ redox potential, the present invention was able to modulate the transmittance in the visible spectral region 230 while keeping the NIR absorption nearly unmodified, as shown in NIR region 234.

POM Solid Matrix

Figure 2D:
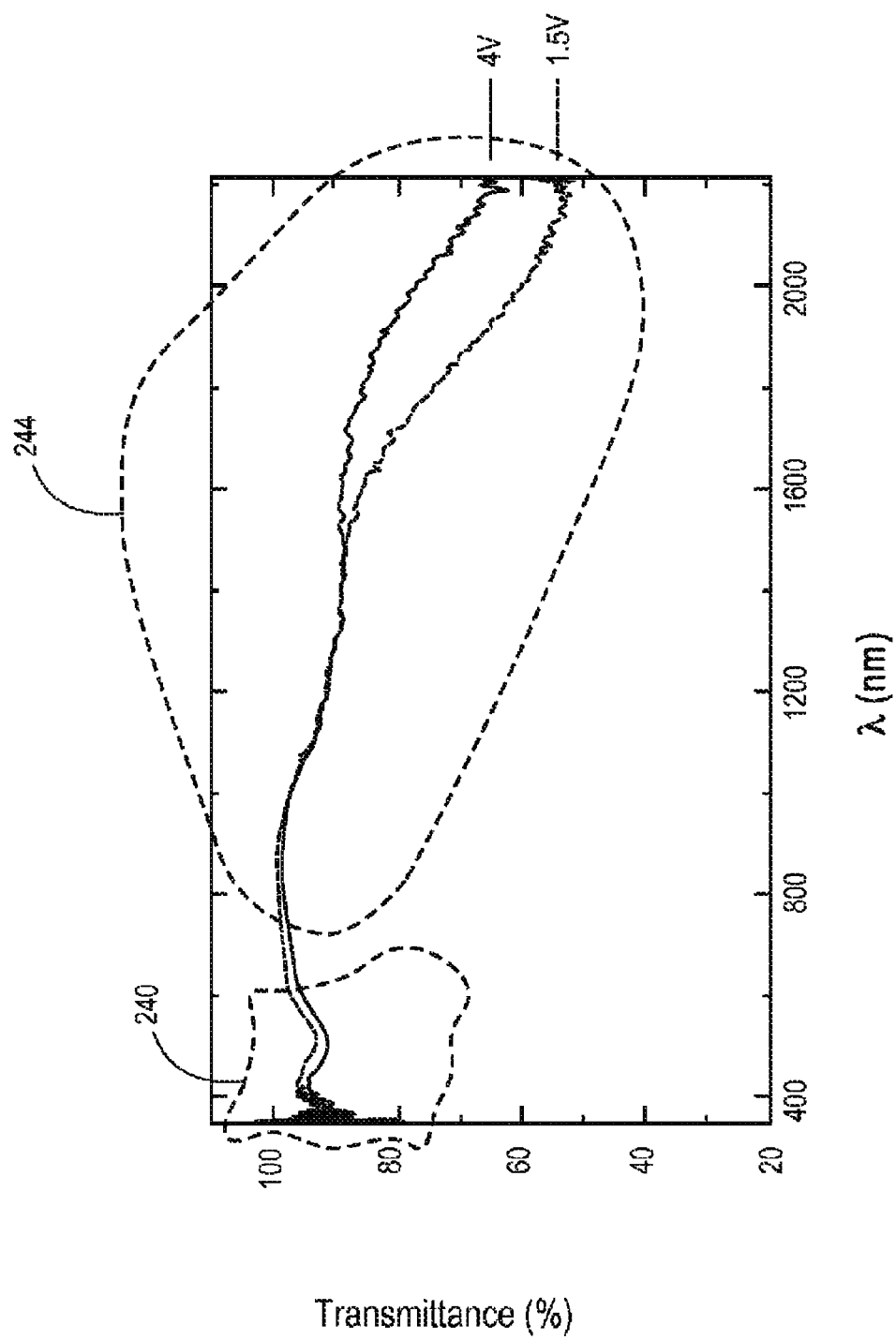
FIG. 2D is a plot of transmittance vs. wavelength for a solid matrix film formed with a polyoxometallate (POMs).

However, when the solid matrix was formed by POMs (e.g., decaniobate clusters), the present invention showed no optical response in the visible range 240 at any applied bias voltage/potential, as shown in FIG. 2D. The NIR light, however, was still modulated by the present invention due to the ITO switching in the NIR region 244, thereby demonstrating that the optical properties of ITO were maintained in the nanocomposite film. The poor optical response of the POM matrix, its luminous transparency, and the ion diffusion ability could be appealing features to use POMs as the solid electrolyte in a NIR-active solid state device.

Other Embodiments

Varying Compositions

The present invention allows for varying the composition of the integrated components. For instance, for the matrix, the present invention could include electrolyte materials like $Ta_2O_5$, or even POMs, which could function in this capacity. Combinations with other chromogenic oxide materials like thermochromics or photochromics could also span the functionality and applicability of the final composite device. This is still an electrochromic composite since at least one of the components would switch electrochromically.

Solid State Device

Figure 7:
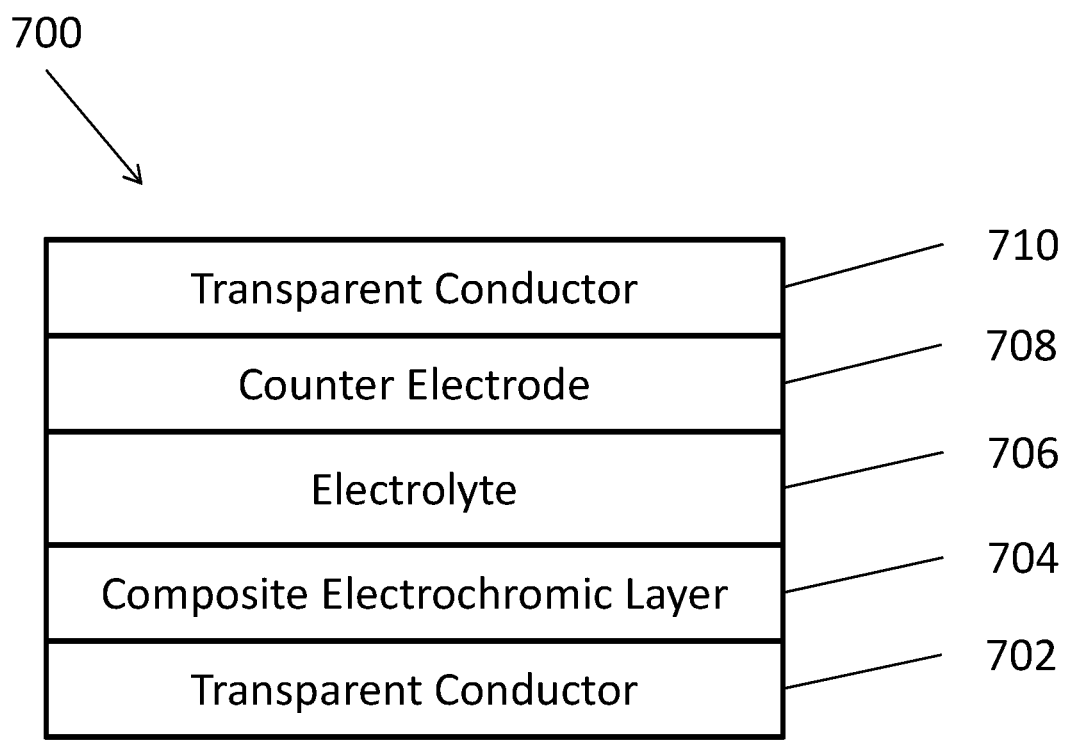
FIG. 7 depicts a schematic view of an electrochromic device according to an exemplary embodiment.

The present invention allows for incorporating a metal oxide composite electrochromic material into a solid state electrochromic device (i.e., coating) by adding additional material layers. FIG. 7 depicts a schematic view of an electrochromic device 700, according to an exemplary embodiment. As shown in FIG. 7, the electrochromic device 700 would thus include 5 conceptual layers: a transparent conductor 702, a composite electrochromic layer 704, a layer of electrolyte 706, a counter electrode 708, and finally another transparent conductor 710. Note that either the electrochromic layer 704 and/or the counter electrode 708 may have a dual role and function also as the adjacent transparent conductor if it is sufficiently conducting. The counter electrode 708 could be capable of storing charge sufficient to counter balance that needed to "color" the composite electrochromic layer and may be a conventional, single-component film, a nanocrystal film, or another nanocomposite layer.

Counter Electrode

In an exemplary embodiment, the present invention provides a nanocomposite film in which the matrix is a solid electrolyte and the TCO nanocrystals are tuned so that their EC response is largely outside the solar spectral range. In an exemplary embodiment, the present invention could be used as a counter electrode that could neither contribute to nor detract from the functionality of the primary electrochromic layer of the present invention. In an exemplary embodiment, the present invention could provide the necessary charge balance (or excess charge capacity). The present invention could be used in an EC device to provide a counter electrode to work with an EC film.

Uses

The present invention could be used in electrochromic windows, displays, or thermal control coatings (e.g., for satellites). The present invention can be prepared by chemical solution methodologies, thus being able to be produced at potentially lower costs when compared to electrochromic films produced by conventional physical deposition techniques. The present invention could be prepared (i) with a range of tunable spectral response in the visible and near-infrared (NIR) regimes, (i) with faster switching times, (iii) with better durability, (iv) higher efficiency, and/or (v) lower costs compared to prior art electrochromic films. The present invention could be used by windows manufacturers, the automotive industry, and/or display companies. The present invention could be used for energy efficient windows. Notably, one single composite material, in accordance with the present invention, could offer control over the amount of light and heat going through the window, which could substantially reduce costs in the lighting and heating/cooling systems of buildings, while providing shading from glare when desired.

REFERENCES

1. *UNEP, Buildings and Climate Change: Status, Challenges and Opportunities, UnitedNations Environment Programme*, Paris, France, 2007.
2. G. A. Niklasson and C. G. Granqvist, Journal of Materials Chemistry, 2007, 17, 127.
3. A. Llordes, A. T. Hammack, R. Buonsanti, R. Tangirala, S. Aloni, B. A. Helms, and D. J. Milliron, Polyoxometalates and colloidal nanocrystals as building blocks for metal oxide nanocomposite films *J. Mater. Chem.* (2011).
4. PCT International Publication Number WO 2011/047198A1, entitled "Nanocomposite and Method of Making Thereof".

CONCLUSION

It is to be understood that the above description and examples are intended to be illustrative and not restrictive. Many embodiments will be apparent to those of skill in the art upon reading the above description and examples. The scope of the invention should, therefore, be determined not with reference to the above description and examples, but should instead be determined with reference to the appended claims, along with the full scope of equivalents to which such claims are entitled. The disclosures of all articles and references, including patent applications and publications, are incorporated herein by reference for all purposes.

What is claimed is:

1. An electrochromic device, comprising:
   a composite electrochromic film comprising transparent conducting oxide (TCO) nanostructures embedded in a matrix comprising an electrochromic metal oxide material;
   a solid electrolyte; and
   a counter electrode,
   wherein the electrochromic film separately controls an amount of visible light and heat transmitted through the device, wherein to separately control, the electrochromic film is to:
      modulate its transmittance in a near infrared (NIR) range of an electromagnetic spectrum in response to a first applied bias voltage by modulation of absorption in the TCO nanostructures, and
      modulate its visible transmittance in response to a second applied bias voltage which is different from the first applied bias voltage.

2. The device of claim 1, wherein the electrochromic film is to decrease its NIR transmittance in response to the first applied bias voltage due to a modulation of a surface plasmon absorption in the TCO nanostructures.

3. The device of claim 2, wherein:
   the electrochromic film exhibits a different transmittance response to the first applied bias voltage and to the second applied bias voltage;
   the transmittance in the visible range of the electromagnetic spectrum remains approximately unchanged while the NIR transmittance of the electrochromic film decreases in response to the first applied bias voltage; and
   the electrochromic film is configured to reversibly darken in at least the visible range of the electromagnetic spectrum in response to the second applied bias voltage.

4. The device of claim 3, wherein the electrochromic film comprises a $Nb_2O_5$-ITO, $V_2O_5$-ITO or $VO_2$-ITO nanocomposite.

5. The device of claim 3, wherein the second applied bias voltage has a larger magnitude than the first applied bias voltage.

6. The device of claim 1, wherein the device comprises an electrochromic window having a first transparent conductor adjacent to the electrochromic film and a second transparent conductor adjacent to the counter electrode.

7. The device of claim 1, wherein the electrochromic film is to control the amount of light transmitted through the electrochromic device by modulating the visible transmittance of the electrochromic film through reversibly darkening or bleaching the electrochromic metal oxide material in a visible range in response to the second applied bias voltage.

8. A method of operating an electrochromic device comprising a composite electrochromic film comprising transparent conducting oxide (TCO) nanostructures embedded in a matrix comprising an electrochromic metal oxide material, a solid electrolyte, and a counter electrode, wherein the method comprises separately controlling an amount of light and heat transmitted through the electrochromic device by:
   applying a first bias voltage to the device to modulate a transmittance of the electrochromic film in a near infrared (NIR) range of an electromagnetic spectrum by modulation of absorption in the TCO nanostructures; and applying a second bias voltage to the device to modulate a transmittance of the electrochromic film in a visible range, wherein the second bias voltage is different from the first bias voltage.

9. The method of claim 8, wherein the transmittance of the electrochromic film in the NIR range is decreased in response to the first bias voltage due to a modulation of a surface plasmon absorption in the TCO nanostructures.

10. The method of claim 9, wherein the second bias voltage is more negative than a redox potential of the electrochromic metal oxide material.

11. The method of claim 9, wherein:
   the electrochromic film exhibits a different transmittance response to the first bias voltage and to the second applied bias voltage;
   the transmittance in the visible range of the electromagnetic spectrum remains approximately unchanged while the transmittance of the electrochromic film in the NIR range decreases in response to the application of the first bias voltage; and
   the electrochromic film reversibly darkens in at least the visible range of the electromagnetic spectrum in response to the application of the second bias voltage.

12. The method of claim 11, wherein the electrochromic film comprises a $Nb_2O_5$-ITO, $V_2O_5$-ITO or $VO_2$-ITO nanocomposite.

13. The method of claim 11, wherein the second bias voltage has a larger magnitude than the first bias voltage.

14. The method of claim 8, wherein the device comprises an electrochromic window having a first transparent conductor adjacent to the electrochromic film and a second transparent conductor adjacent to the counter electrode.

15. The method of claim 8, wherein:
   the TCO nanostructures comprise metal oxide nanocrystals.

16. The method of claim 8, wherein controlling the amount of light transmitted through the electrochromic device comprises applying the second bias voltage to modulate the visible transmittance of the electrochromic film through reversibly darkening or bleaching the electrochromic metal oxide material in the visible range.

* * * * *